United States Patent
Choi et al.

(10) Patent No.: US 8,005,506 B2
(45) Date of Patent: Aug. 23, 2011

(54) MOBILE TERMINAL HAVING ROTATING INPUT DEVICE

(75) Inventors: Kyoo-Sung Choi, Seoul (KR); Ju-Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 852 days.

(21) Appl. No.: 12/014,585

(22) Filed: Jan. 15, 2008

(65) Prior Publication Data

US 2008/0171572 A1 Jul. 17, 2008

(30) Foreign Application Priority Data

Jan. 15, 2007 (KR) ........................ 10-2007-0004212

(51) Int. Cl.
 *H04M 1/00* (2006.01)
(52) U.S. Cl. ................. 455/556.1; 455/575.1; 455/90.3
(58) Field of Classification Search ................. None
 See application file for complete search history.

(56) References Cited

U.S. PATENT DOCUMENTS

| | | | |
|---|---|---|---|
| 6,556,222 B1 | 4/2003 | Narayanaswami | |
| 6,681,124 B2 | 1/2004 | Prior et al. | |
| 7,286,301 B2 * | 10/2007 | Kim | 359/694 |
| 7,286,302 B2 | 10/2007 | Ohzawa et al. | |
| 7,288,119 B2 | 10/2007 | Slattery et al. | |
| 7,765,495 B2 * | 7/2010 | Choi et al. | 715/864 |
| 2003/0169286 A1 | 9/2003 | Misawa | |
| 2003/0197740 A1 | 10/2003 | Reponen | |
| 2003/0210224 A1 | 11/2003 | Bartholomew et al. | |
| 2004/0155907 A1 | 8/2004 | Yamaguchi et al. | |
| 2004/0164957 A1 | 8/2004 | Yamaguchi et al. | |
| 2004/0209642 A1 | 10/2004 | Kim | |
| 2006/0095865 A1 | 5/2006 | Rostom | |
| 2006/0098975 A1 | 5/2006 | Kobayashi | |
| 2006/0250640 A1 | 11/2006 | Lapstun et al. | |
| 2007/0030963 A1 | 2/2007 | Wyld et al. | |
| 2007/0155434 A1 | 7/2007 | Jobs et al. | |
| 2007/0268258 A1 | 11/2007 | Chen et al. | |
| 2008/0062141 A1 | 3/2008 | Chandhri | |
| 2008/0079700 A1 | 4/2008 | Everest et al. | |
| 2008/0276168 A1 | 11/2008 | Mansfield et al. | |

FOREIGN PATENT DOCUMENTS

| | | |
|---|---|---|
| CN | 1498015 | 5/2004 |
| EP | 0913977 A2 | 5/1999 |
| EP | 1429236 A1 | 9/2002 |
| EP | 1411707 A1 | 4/2004 |
| EP | 1524821 A1 | 4/2005 |
| EP | 1655953 A1 | 5/2006 |
| EP | 1684158 A1 | 7/2006 |
| JP | 08-123647 | 5/1996 |
| JP | 2004-032548 | 1/2004 |
| JP | 2004-157640 | 6/2004 |
| JP | 2005084279 | 3/2005 |
| JP | 2005-092667 | 4/2005 |
| WO | 0031948 | 6/2000 |

OTHER PUBLICATIONS

Der Elektroniker; "Linear Hall Sensor measure current, displacement, angle of rotation, forces and pressures"; IEE Journal Paper; May 6, 1981.

\* cited by examiner

*Primary Examiner* — Erika Gary
(74) *Attorney, Agent, or Firm* — Lee, Hong, Degerman, Kang & Waimey

(57) ABSTRACT

A mobile terminal includes a display located on a front side of the terminal and an input device located on a rear side of the terminal and having a rotatable wheel.

23 Claims, 15 Drawing Sheets

MOBILE TERMINAL HAVING ROTATING INPUT DEVICE

CROSS-REFERENCE TO RELATED APPLICATIONS

Pursuant to 35 U.S.C. §119(a), this application claims the benefit of earlier filing date and right of priority to Korean Application No. 10-2007-0004212, filed on Jan. 15, 2007, the contents of which are hereby incorporated by reference herein in their entirety.

FIELD OF THE INVENTION

The present invention relates to a mobile terminal having a rotating input device to operate the terminal.

DESCRIPTION OF THE RELATED ART

The related art mobile terminal has a rotating input device on a front surface or a side surface of the mobile terminal. It is not easy for a user to operate the rotating input device with only one hand while holding the mobile terminal.

SUMMARY OF THE INVENTION

One aspect of the present invention is to provide a mobile terminal having a body which includes a front side and an opposing rear side, a display located on the front side, and an input device located on the rear side and including a rotatable wheel, wherein the input device is configured to permit user input responsive to rotation of the wheel about an axis which is substantially normal to the rear side, allowing a user to easily operate the input device with one hand.

Preferably, the body of the mobile terminal is a unitary structure. The mobile terminal may also have an aperture which is formed within the rotatable wheel and sized to cooperate with a lens and an associated camera. Preferably, the aperture is positioned at a center of the rotatable wheel. More preferably, the mobile terminal also has a lens opening and closing unit to open and close the lens of the camera.

The lens opening and closing unit includes a fixed plate having a through hole to expose the lens, a rotatable rotary plate positioned at a lower side of the fixed plate and having a through hole to expose the lens, and a lens cover positioned at an upper side of the fixed plate and connected to the rotary plate to open and close the through hole formed at the fixed plate in response to rotation of the rotary plate. The lens cover may include a first portion rotating around a first shaft at a first point of the fixed plate and a second portion rotating around a second shaft at a second point of the fixed plate, wherein the first portion and the second portion rotate and contact each other to close the through hole and rotate and separate from each other to open the through hole.

The mobile terminal may also have a first elastic member that provides elastic force to return the rotating wheel to its initial set position when the rotating wheel is rotated and a sensor that recognizes a rotational direction of the rotating wheel. The mobile terminal may further have a second elastic member provided between the fixed plate and the rotary plate, and providing elastic force to make the rotary plate return to its initial set position when the rotary plate is rotated.

Preferably, the second elastic member is a coil spring one end portion of which is connected to the fixed plate and the other end portion of which is connected to the rotary plate, and the sensor is a Hall sensor that senses a change in a magnetic field of a magnet provided at the rotating wheel according to rotation of the rotating wheel.

The mobile terminal may additionally have a frame provided within the terminal and on which the wheel is mounted. The mobile terminal may also have at least one signal terminal provided at a lower side of the frame that selects a particular mode of the terminal and a pressing protrusion provided at an upper side of the signal terminal that moves down when the wheel is pressed in order to operate the signal terminal.

Preferably, the pressing protrusion is protrusively formed on a rear surface of the support plate and further includes a support plate provided at the lower side of the frame that supports the frame.

Preferably, the wheel is rotatable in a rotational range which is less than 180 degrees and the mobile terminal may also include a switch positioned below the wheel, wherein pressing down the switch causes an input. Also preferably, a plurality of icons is displayed on the display and one of the plurality of icons is selected in response to the user input.

Another aspect of present invention is to provide a mobile terminal having a body which includes a front side and an opposing rear side, a display unit located on the front side of the body, an input unit including a rotatable wheel located at the rear side, and a camera unit including an aperture, wherein the input unit and the camera unit are located such that the aperture is positioned at a center of the rotatable wheel.

Preferably, the mobile terminal also has a lens opening and closing unit positioned at the center of the wheel to open and close a lens of the camera.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
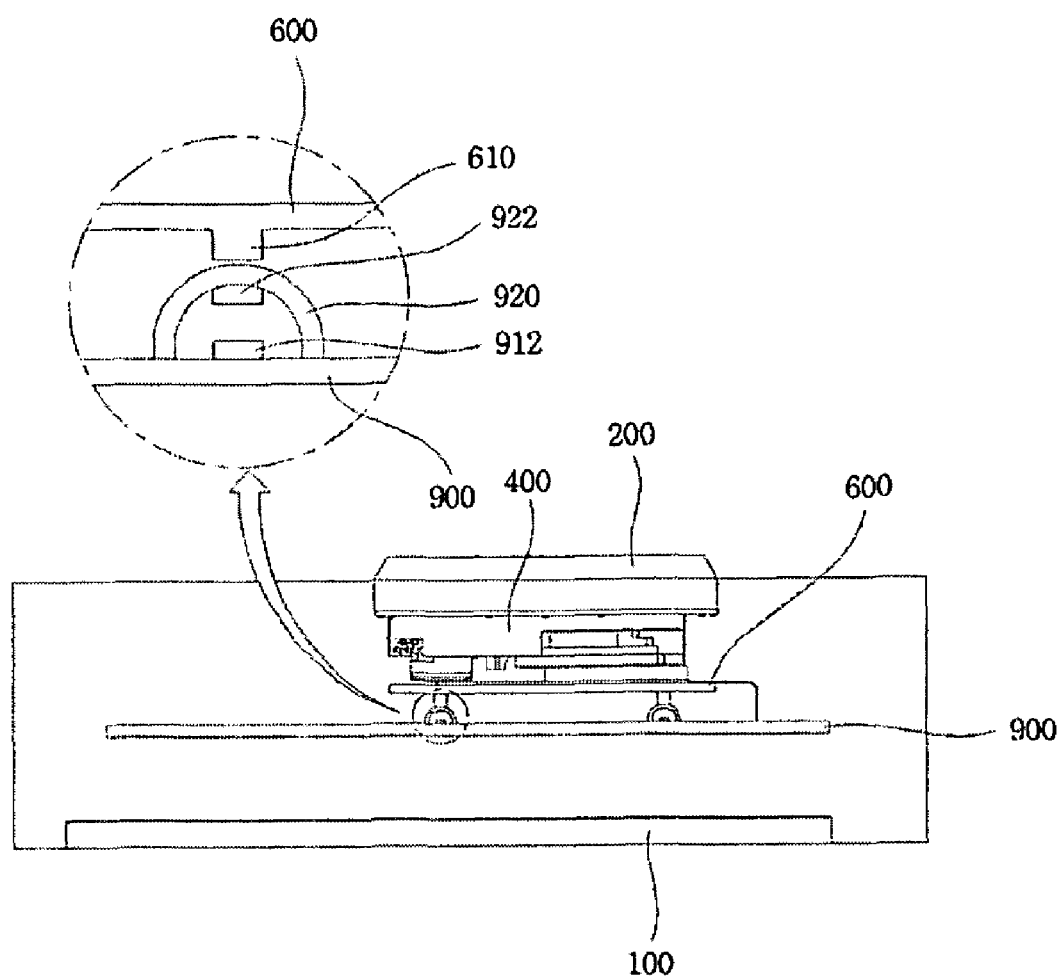
FIG. 1 is a schematic sectional view of a mobile terminal having a rotating input device according to one embodiment of the present invention.
Figure 2:
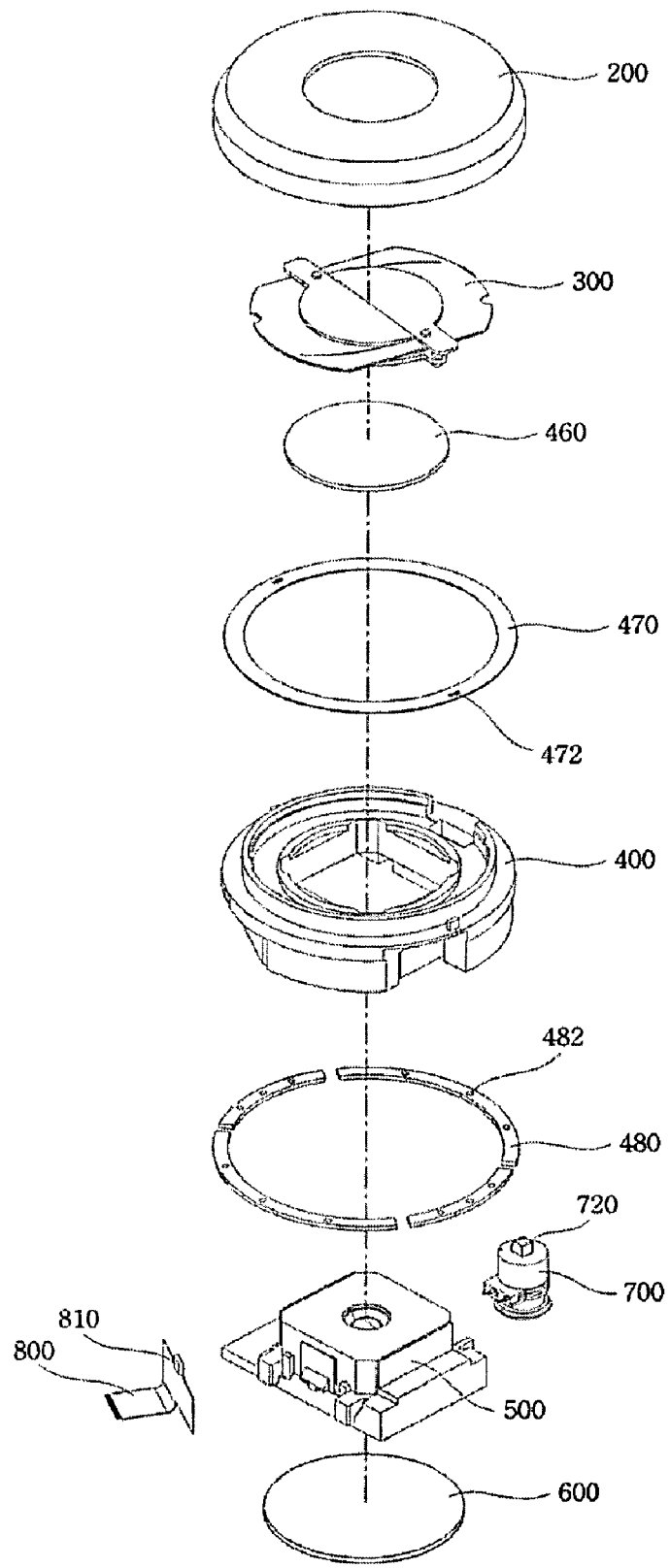
FIG. 2 is an exploded view of a part of the mobile terminal having the rotating input device according to the embodiment of the present invention illustrated in FIG. 1.

With reference to FIGS. 1 and 2, a mobile terminal having a rotating input device includes a display 100, a rotatable wheel 200, a lens opening and closing unit 300, a frame 400, a camera 500, and a support plate 600. Referring to FIG. 1, the display 100 is provided on a front surface of the mobile terminal. The rotatable wheel 200 is provided on a rear surface of the mobile terminal. The rotatable wheel 200 is rotatably mounted on the frame 400.

Referring to FIG. 2, the camera 500 is installed at an inner side of the frame 400. A front portion of the camera 500 is insertedly positioned in a through hole formed at the central portion of the frame 400.

With further reference to FIGS. 1 and 2, the support plate 600 having a circular shape is provided at a lower side of the camera 500 in order to support the camera. A pressing protrusion 610 is formed in a circumferential shape on a lower surface of the support plate 600.

With reference to FIG. 1, the terminal includes a PCB (Printed Circuit Board) 900. The PCB 900 includes a fixed signal terminal 912 formed in a circumferential shape at an interval corresponding to an interval of the pressing protrusion 610. Referring to FIGS. 1 and 2, a Flexible PCB (FPCB) 800 is connected with the PCB 900 by circuitry.

With further reference to FIG. 1, a dome switch 920 is mounted at an upper side of the fixed signal terminal 912. The dome switch 920 is formed at the upper side of each fixed signal terminal 912 and includes a variable signal terminal 922 formed on an inner surface thereof. When the dome switch 920 is pressed, the variable signal terminal 922 makes contact with the fixed signal terminal 912.

With further reference to FIG. 1, the support plate 600 is mounted at an upper side of the dome switch 920. Because the pressing protrusion 610 of the support plate 600 is positioned at the upper side of the dome switch 920, the dome switch 920 is pressed toward the fixed signal terminal 912 through the pressing protrusion 610 when the rotatable wheel 200 is pressed down, With reference to FIG. 2, a motor 700 is provided at a side of the camera 500. The motor 700 includes a lead screw that is movable up and down when the motor is rotated. A vertical movement protrusion 720 is connected to the lead screw. The vertical movement protrusion 720 includes sloped faces which slidably contact slope faces of a rotary protrusion 322 (see FIG. 8) according to vertical movement of the lead screw. When the vertical movement protrusion 720 moves up according to rotation of the motor 700, it contacts the rotary protrusion 322 to provide a rotational force to the rotary protrusion, thereby rotating the rotary plate 320 shown in FIG. 8.

With further reference to FIG. 2, the FPCB 800 is connected to the camera 500. A Hall sensor 810 is mounted on the FPCB 800, in which a signal terminal for operating the Hall sensor and a signal terminal for operating the motor 700 are patterned. A foreign material infiltration preventing window made of a transparent material 460 is provided at the through hole formed at a central portion of the frame 400. The foreign material infiltration preventing window 460 prevents infiltration of a foreign material, such as debris, into a lens of the camera 500 from the exterior.

When the rotatable wheel 200 is mounted on the frame 400, a fixing washer 480 is fastened to a lower end surface of the circumferential portion of the rotatable wheel. Fastening recesses 482 corresponding to fastening protrusions 230 (see FIG. 4) formed on a lower end surface of the circumferential portion of the rotatable wheel 200 are formed on the fixing washer 480. An outer portion of an upper surface of the fixing washer 480 contacts the lower end surface of the circumferential portion of the rotatable wheel 200, and an inner portion of the upper surface of the fixing washer 480 contacts a stopping protrusion 412 of the frame body 410 (see FIG. 9) Since the fixing washer 480 is fastened to the lower end surface of the circumferential portion of the rotatable wheel 200 and caught by the stopping protrusion 412 of the frame body 410, the rotatable wheel 200 is prevented from being released from the frame 400.

Figure 3:
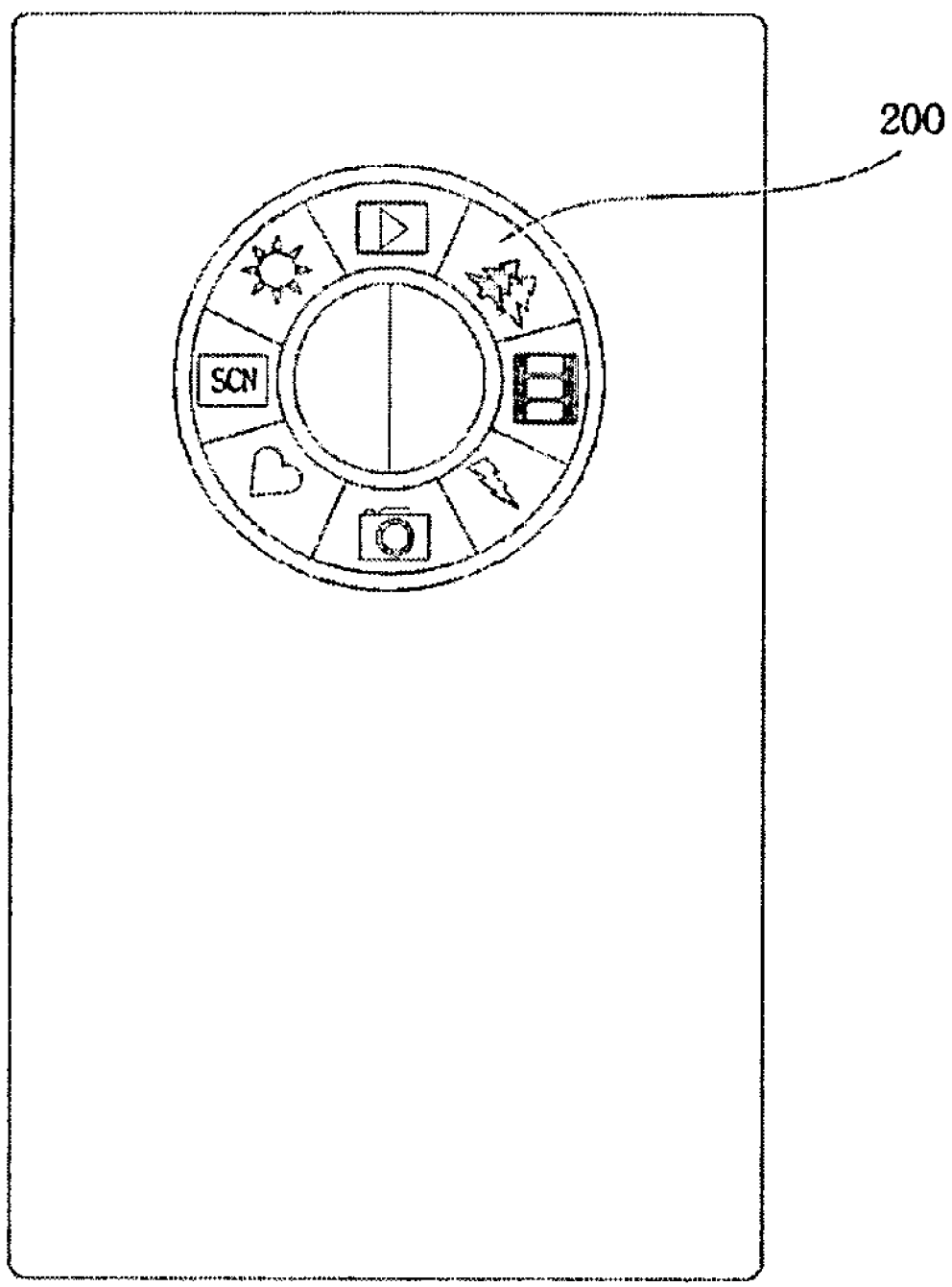
FIG. 3 is a rear view of the mobile terminal having the rotating input device according to the embodiment of the present invention illustrated in FIG. 1.

With further reference to FIG. 2, the rotatable wheel 200 includes an upper surface, a slope portion extending downwardly from the upper surface, and a circumferential portion extending downwardly from the slope portion. A through hole is formed on the upper surface of the rotatable wheel 200 to expose the lens of the camera 500. With reference to FIG. 3, icons indicating modes of the terminal are marked on the upper surface of the rotatable wheel 200.

Figure 4:
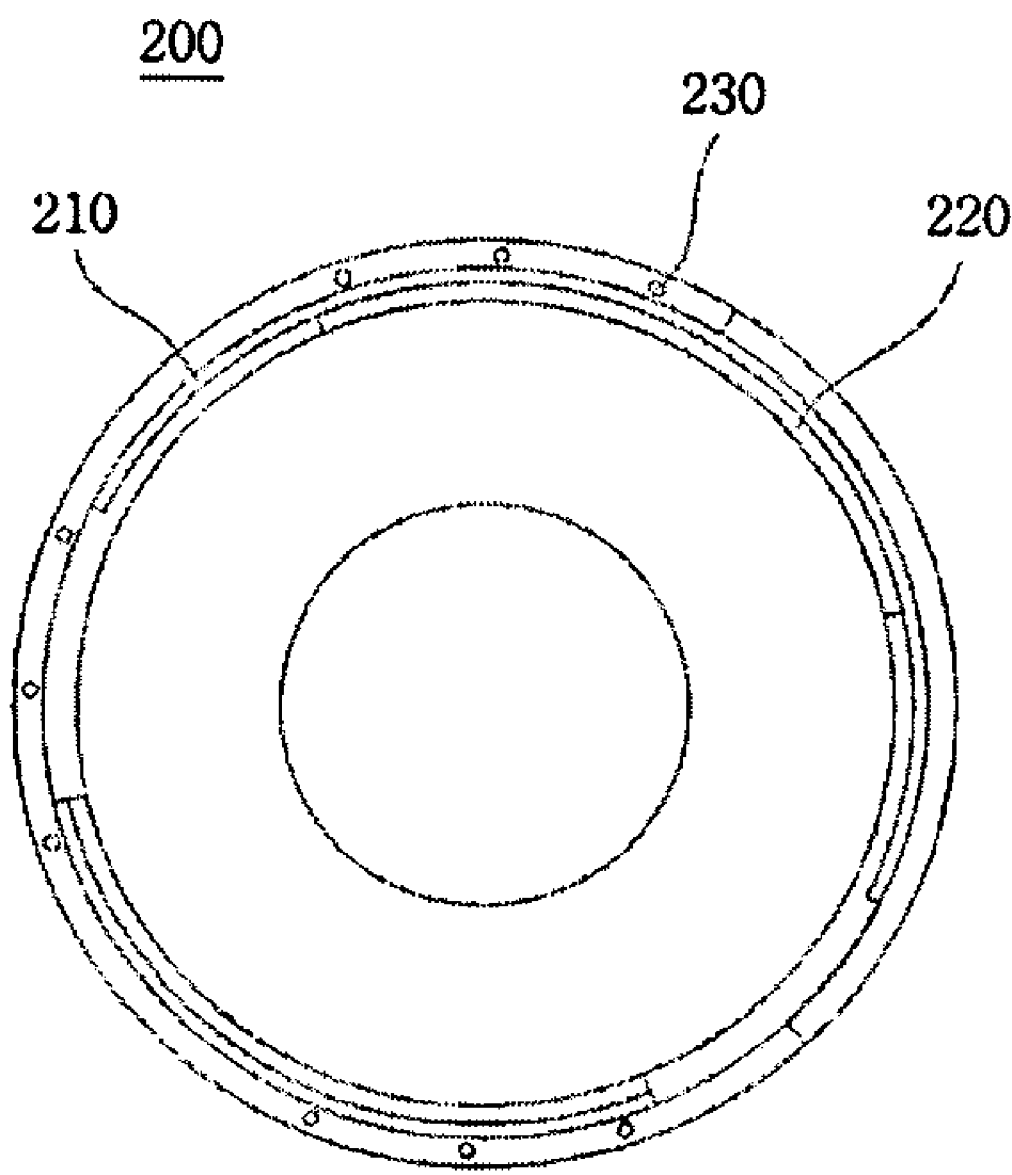
FIG. 4 is a rear view of a rotatable wheel of the mobile terminal having the rotating input device according to the embodiment of the present invention illustrated in FIG. 1.
Figure 9:
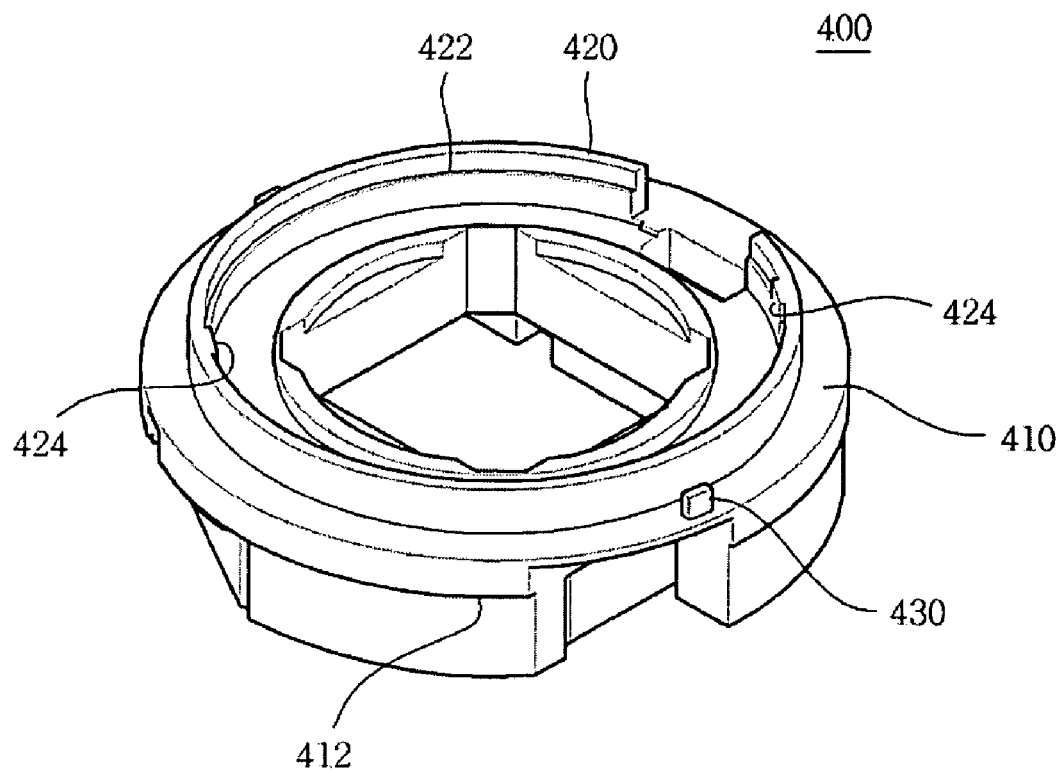
FIG. 9 is a perspective view of a frame of the mobile terminal having the rotating input device according to the embodiment of the present invention illustrated in FIG. 1.

With reference to FIGS. 2, 4 and 9, a thrust washer 470 is mounted on the upper surface of the frame body 410. The thrust washer 470 is positioned at an outer side of the support protrusion 420 and includes two fixing recesses 472 insertedly fixed to the two movement protrusions 430. The thrust washer 470 is mounted to support a hindrance protrusion 220 of the rotatable wheel 200 when the rotatable wheel is mounted on the frame 400, and has a thickness that corresponds to a height difference between the support protrusion 210 and the hindrance protrusion of the rotatable wheel. The thrust washer 470 reduces frictional contact when the rotatable wheel 200 and the frame 400 are rotated, allowing them to rotate smoothly.

Figure 5:
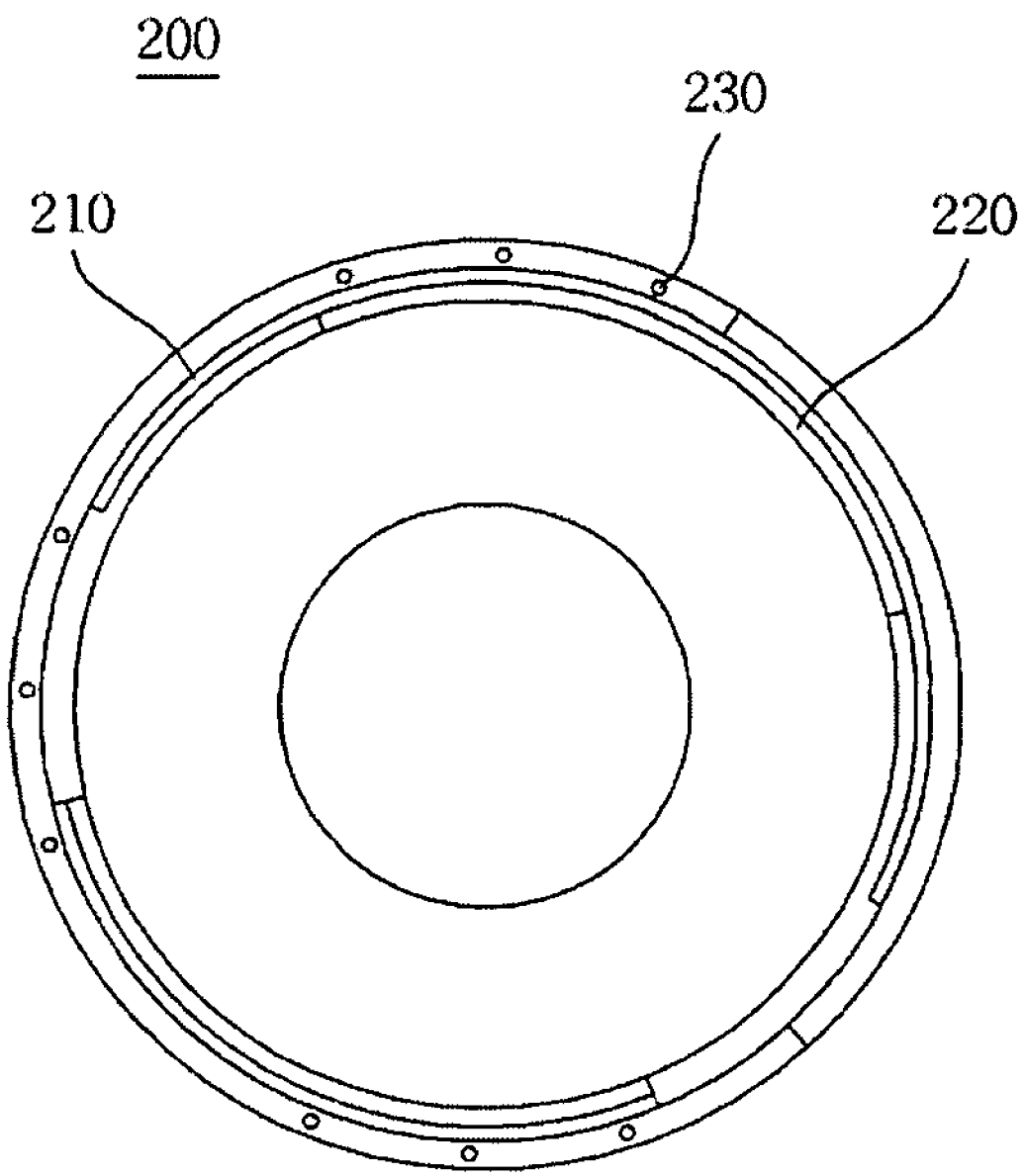
FIG. 5 is a rear perspective view of the rotatable wheel of the mobile terminal having the rotating input device according to the embodiment of the present invention illustrated in FIG. 1.

With reference to FIGS. 4 and 5, a support protrusion 210 is formed on a rear surface of the rotatable wheel 200. The support protrusion 210 is formed in a circular arc shape and its outer surface is integrally formed with an inner surface of a circumferential portion of the rotatable wheel 200. The hindrance protrusion 220 is protrusively formed on the rear surface of the rotatable wheel 200. The hindrance protrusion 220 is formed in a circular arc shape and its outer surface is integrally formed with an inner surface of the support protrusion 210. The hindrance protrusion 220 is formed such that both ends of the hindrance protrusion and both ends of the support protrusion 210 form an angle slightly greater than 45° clockwise and counterclockwise with respect to the center of the rotatable wheel 200. In addition, the hindrance protrusion 220 has height lower than the height of the support protrusion 210. One or more fastening protrusions 230 are protrusively formed on a lower end portion of the circumferential portion of the rotatable wheel 200.

Figure 6:
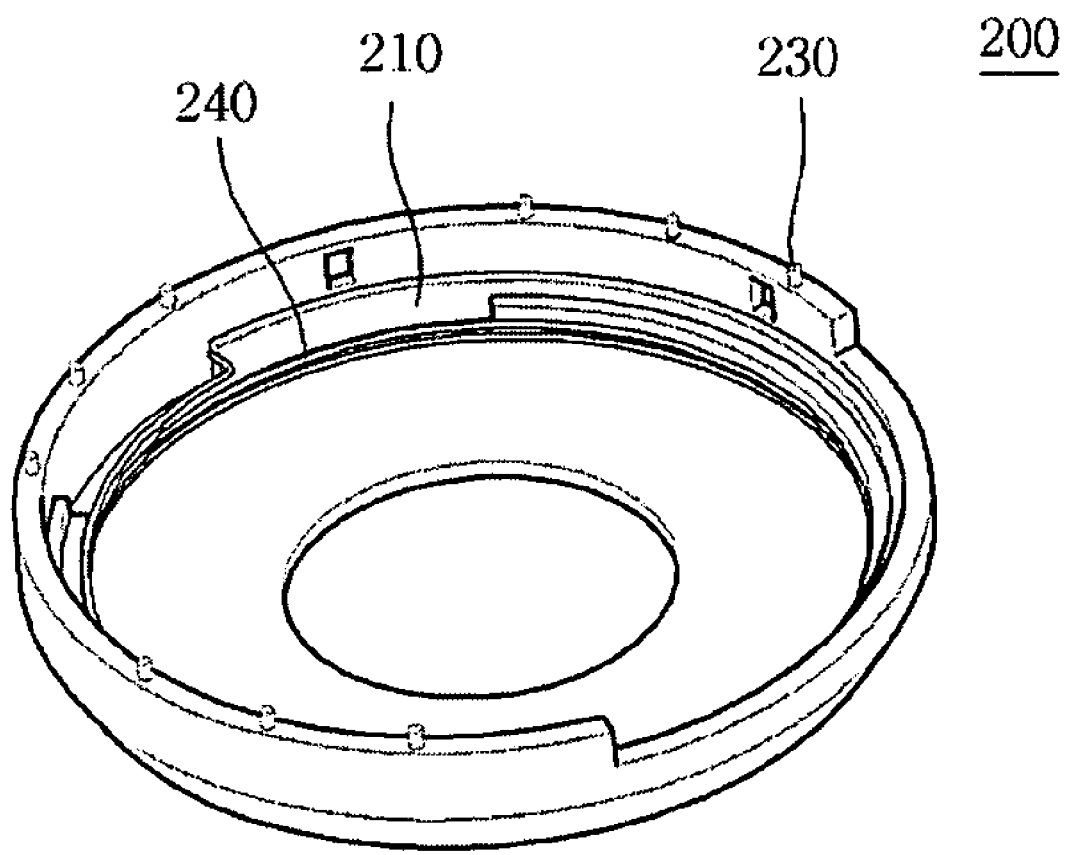
FIG. 6 is a rear perspective view of the rotatable wheel of the mobile terminal having the rotating input device with a first elastic member according to the embodiment of the present invention illustrated in FIG. 1.

With reference to FIG. 6, a torsion spring 240 is mounted on the rear surface of the rotatable wheel 200. The torsion spring 240 includes protruded end portions which are formed to protrude from both ends thereof in a direction perpendicular to a circumferential direction. The torsion spring 240 is fixed at a certain portion of both protruded end portions that contact both ends of the support protrusion 210. Also, the torsion spring 240 is mounted such that a certain portion of its wound part contacts with an inner surface of the hindrance protrusion 220.

Figure 7:
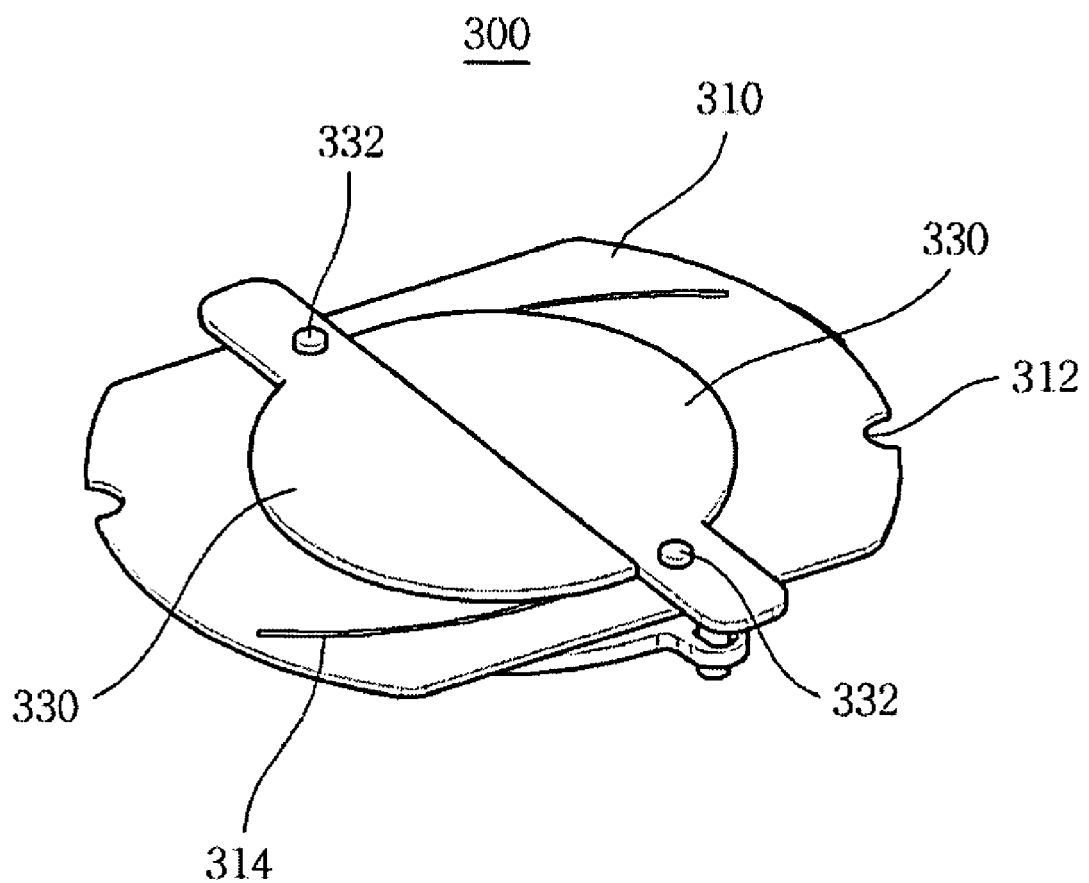
FIG. 7 is a perspective view of a lens opening and closing unit of the mobile terminal having the rotating input device according to the embodiment of the present invention illustrated in FIG. 1.
Figure 8:
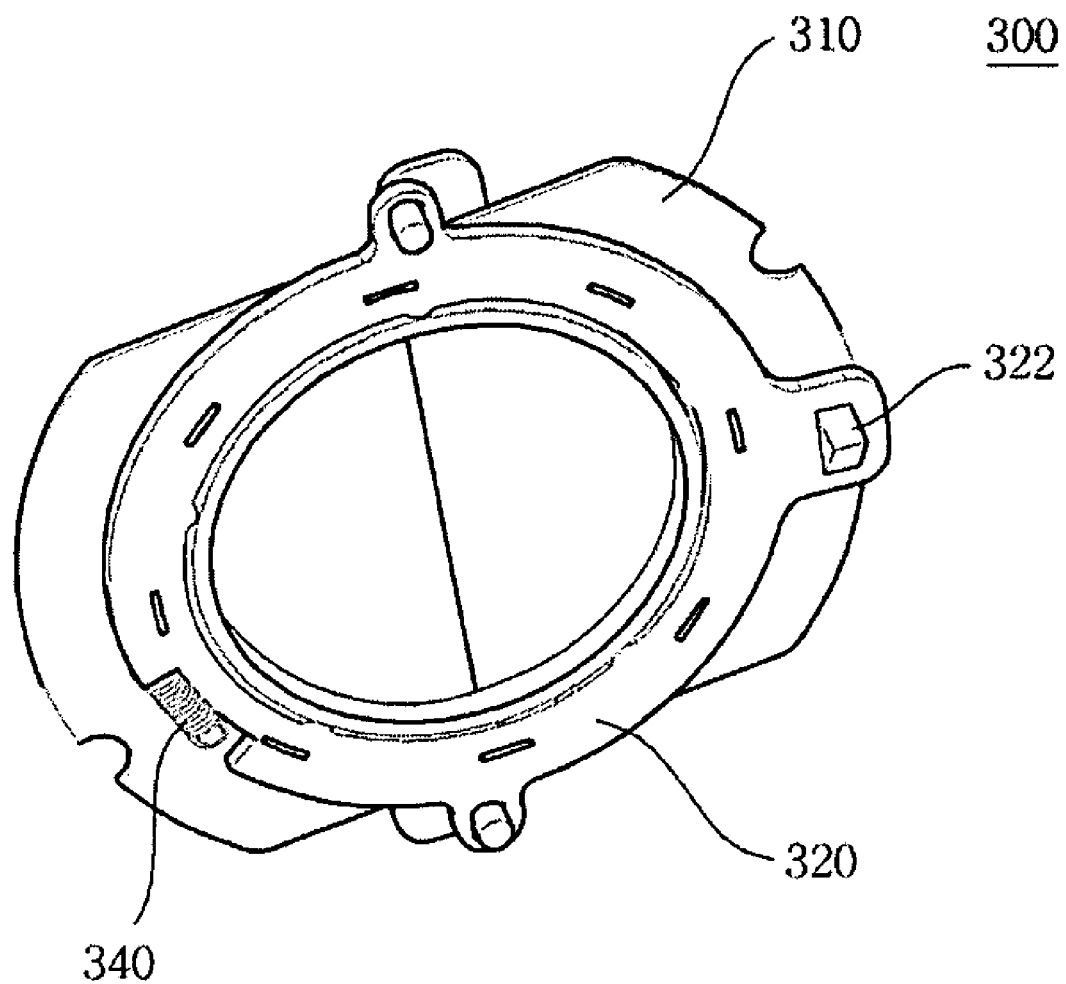
FIG. 8 is a rear perspective view of the lens opening and closing unit of the mobile terminal having the rotating input device according to the embodiment of the present invention illustrated in FIG. 1.

With reference to FIGS. 7 and 8, the lens opening and closing unit 300 that opens and closes the lens of the camera 500 is mounted on the frame 400, and includes a fixed plate 310, a rotary plate 320, and a lens cover 330. An outer edge of the fixed plate 310 includes two circular arc portions connected by two linear portions. One circular arc portion faces the other circular arc portion and one linear portion faces the other linear portion.

With reference to FIGS. 7-9, the two circular arc portions are mounted at the mounting protrusion 422 and each circular arc portion includes a stopping recess 312 caught by the stopping protrusion 424 of the frame 400 in order to prevent rotation of the fixed plate 310. A through hole is formed at a central portion of the fixed plate 310 to expose the lens of the camera 500.

With reference to FIG. 7, a lens cover 330 is provided at an upper side of the fixed plate 310. The lens cover 330 includes first and second portions.

Certain sections of the first and second portions of the lens cover 330 are rotated centering around hinge shafts 332 on the upper surface of the fixed plate 310, thereby contacting each other and being separated from each other when opening and closing the through hole formed at the fixed plate 310. In addition, one end of each of the first and second portions of the lens cover 330 is fixedly connected to the rotary plate 320, respectively, such that when the rotary plate is rotated in one direction, the first and second portions of the lens cover 330 are rotated centering around the hinge shafts 332 to open the through hole formed at the fixed plate 310. Guiding protrusions 314 are formed on the upper surface of the fixed plate 310 in order to guide the first and second portions of the lens cover 330 when the first and second portions of the lens cover are rotated.

With reference to FIG. 8, the rotary plate 320 is provided at a lower side of the fixed plate 310. A through hole is formed at a central portion of the rotary plate 320 to expose the lens of the camera 500 positioned at a lower side of the rotary plate 320.

The rotary plate 320 is formed in an annular shape. A recess is formed at an outer circumferential surface of the rotary plate 320, in which a coil spring 340 is mounted. One side of the coil spring is connected with the fixed plate 310 and the other side of the coil spring is connected with the rotary plate 320.

With further reference to FIGS. 7 and 8, the coil spring 340 is mounted to provide an elastic restoration force to cause the rotary plate 320 and the lens cover 330 to return to their original position when the first and second portions of the lens cover 330 are opened by rotation of the rotary plate 320.

A rotary protrusion 322 is formed on a lower surface of the rotary plate 320. The rotary protrusion 322 includes sloped faces formed to slope in a vertical direction in order to change vertical movement to horizontal movement.

With reference to FIG. 9, the frame 400 includes a frame body 410. A through hole is vertically formed at a central portion of the frame body 410 and an outer wall is externally protruded from an upper end root portion of the frame body to reach an upper end in order to form a stopping protrusion 412.

The protruded outer wall of the upper end of the frame body 410 has a circumferential shape and diameter which is a slightly smaller than the circumferential shape and diameter of an inner surface of a circumferential portion of the rotatable wheel 200 such that the protruded outer wall does not contact an inner surface of the circumferential portion of the rotatable wheel 200 when the rotatable wheel is mounted on the frame 400. With reference to FIGS. 6 and 9, the height of the protruded outer wall of the upper end of the frame body 410 corresponds to a height difference between a lower end of the circumferential portion of the rotatable wheel 200 and a lower end of the support protrusion 210.

With further reference to FIG. 9, a support protrusion 420 is formed on an upper surface of the frame body 410. The support protrusion 420 is formed in a circular arc shape at an inner side with a certain distance from an edge of the upper surface of the frame body 410.

With reference to FIGS. 6 and 9, the diameter of an outer surface of the support protrusion 420 is smaller than the diameter of the wound part of a torsion spring 240 such that when the rotatable wheel 200 is mounted on the frame 400, it is positioned at an inner side of the wound part of the torsion spring 240. A mounting protrusion 422 is formed along a circumferential direction on the inner surface of the support protrusion 420 in order to allow a circular plate to be mounted thereon. Stopping protrusions 424 are formed upwardly at certain portions of the mounting protrusion 422.

With further reference to FIG. 9, two movement protrusions 430 are formed on the upper surface of the frame body 410 at an outer side of the support protrusions 420. With further reference to FIG. 6, the movement protrusions 430 contact protruded end portions of the torsion spring 240 when the rotatable wheel 200 is mounted on the frame 400 such that when the rotatable wheel is rotated in either direction, the movement protrusions 430 press the torsion spring 240.

The movement protrusions 430 are respectively formed at positions where they selectively contact one of the ends of the hindrance protrusion 220 of the rotatable wheel 200 in order to hinder rotation of the rotatable wheel when the rotatable wheel is rotated in either direction. In addition, the movement protrusions 430 have sufficient length in a circumferential direction to selectively contact one of the ends of the hindrance protrusion 220 of the rotatable wheel 200 when the rotatable wheel is rotated by 45° in either direction. Accordingly, when the rotatable wheel 200 is mounted on the frame 400, the movement protrusions 430 are positioned at an outer side of the wound part of the torsion spring 240.

Figure 10:
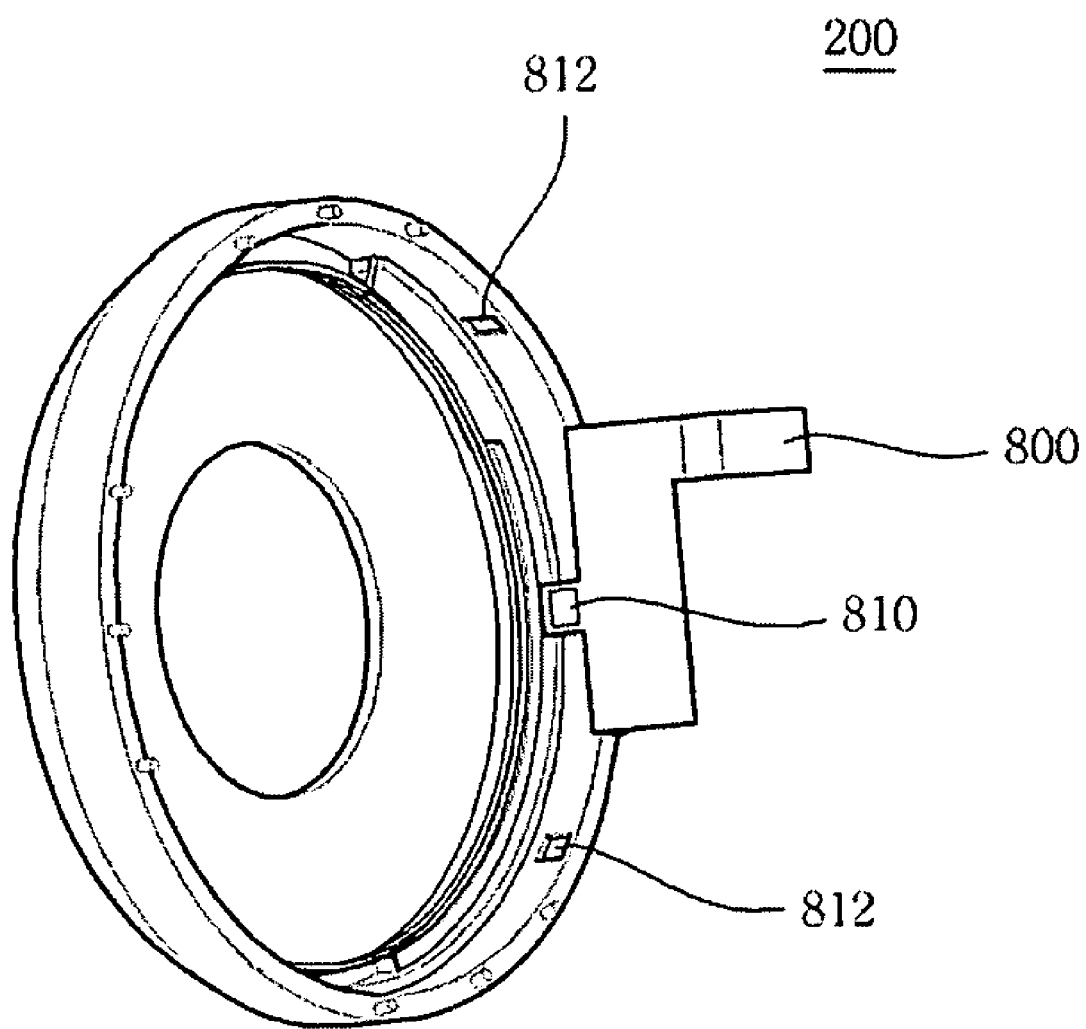
FIG. 10 is a view of the rotatable wheel and a Hall sensor of the mobile terminal having the rotating input device according to the embodiment of the present invention illustrated in FIG. 1.

With reference to FIG. 10, two magnets 812 are mounted on an inner surface of the circumferential portion of the rotatable wheel 200. One magnet has N pole and the other has S pole. The Hall sensor 810 senses a change in a magnetic field of the magnets 812 mounted on the rotatable wheel 200 according to rotation of the rotatable wheel, thereby sensing a rotational direction of the rotatable wheel. The FPCB 800 is mounted in an initial set state such that the Hall sensor 810 is positioned at a central portion between the two magnets 812.

Figure 11:
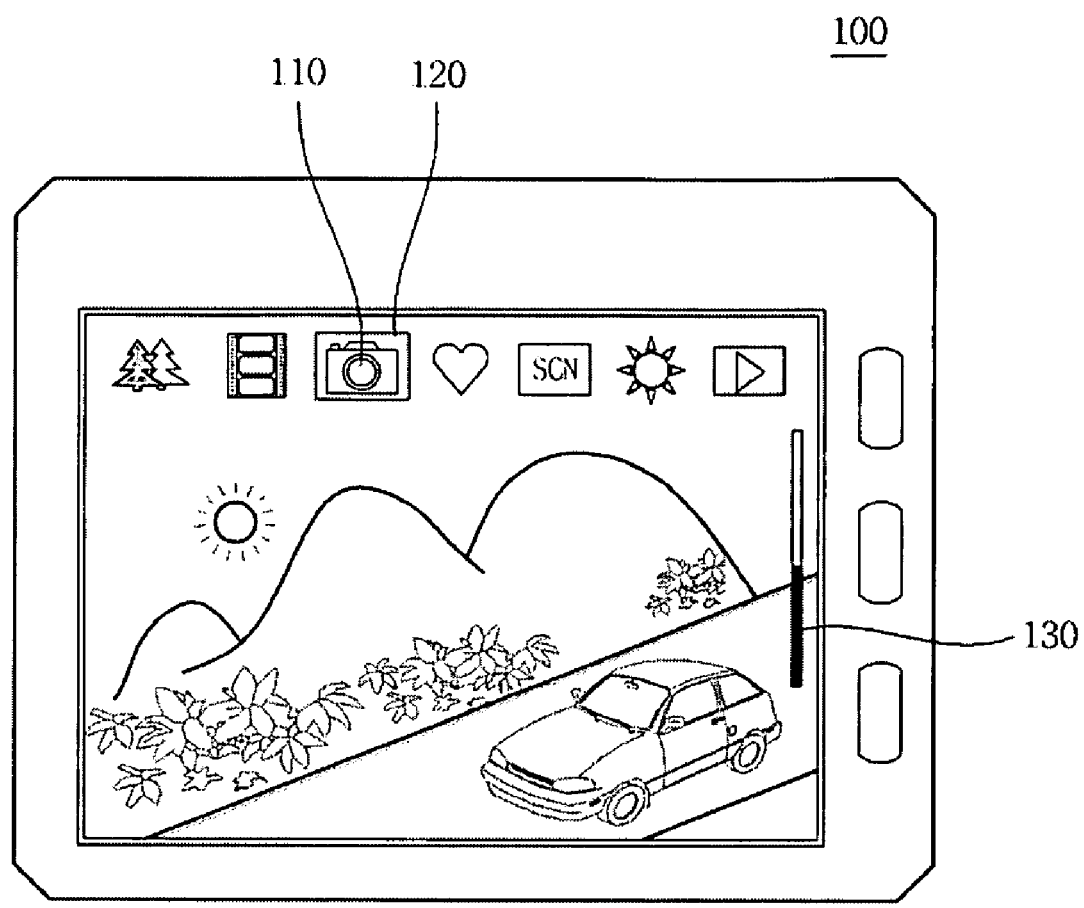
FIGS. 11 to 16 illustrate operations of the mobile terminal having the rotating input device according to the embodiment of the present invention illustrated in FIG. 1.

With reference to FIG. 11, multiple icons 110 corresponding to various modes of the terminal are displayed on the display 100 for selection according to a particular mode of the terminal. An indicator 120 is also displayed to indicate the icon 110 corresponding to the selected particular mode when the rotatable wheel 200 or a key button is clicked.

When the rotatable wheel 200 is rotated in either direction, the indicator 120 displayed on the display 100 selectively indicates the next icon 110 positioned to the left or right. The indicator 120 continuously indicates the next icon 110 whenever a certain time lapses since the rotatable wheel 200 has rotated by 45°.

Figure 12:
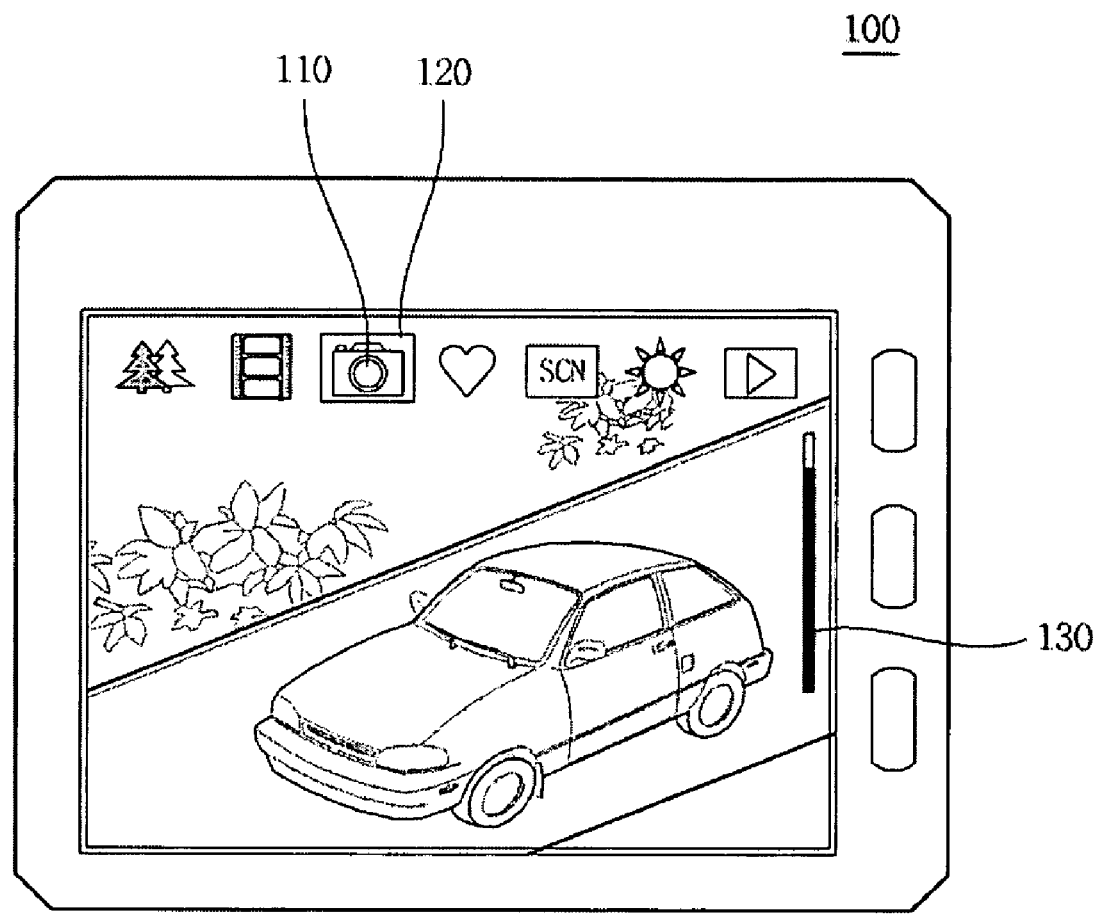

With reference to FIGS. 11 and 12, a preview image is selectively zoomed in or out by the camera according to rotation of the rotatable wheel 200 when the rotatable wheel is rotated in either direction after the rotatable wheel or a key button is clicked to select a camera mode. As illustrated, the function of zooming in or out is continuously performed whenever a certain time lapses when the rotatable wheel 200 is rotated by 45°. An indicator 130 is displayed with the preview image on the display 100 to indicate the degree to which the camera is zoomed in or out when the camera mode is selected.

Although not shown in FIGS. 11 and 12, a video or a still image stored in the terminal may be displayed on the display 100 by clicking the rotatable wheel 200 or a key button and the video or the still image may also be zoomed in or out by rotating the rotatable wheel. When the rotatable wheel 200 is rotated by 45°, the video or the still image is zoomed in or out continuously whenever a certain time lapses. Also, the indicator is displayed to indicate the degree to which the video or the still image stored in the terminal is zoomed in or out.

Although not shown in the FIGS. 11 and 12, a video or the still image stored in the terminal may be displayed on the display 100 by clicking the rotatable wheel 200 or a key button and the video or the still image can be selectively scrolled left or right by rotating the rotatable wheel in either direction. When the rotatable wheel 200 is rotated by 45°, the video or the still image may be continuously scrolled left and right whenever a certain time lapses. Also, an indicator is displayed to indicate a degree of scrolling with respect to the video and the still images stored in the terminal.

Sounds may also be generated. The volume of the sounds may be increased or decreased by rotating the rotatable wheel 200 in either direction. When the rotatable wheel 200 is rotated by 45°, the volume can be continuously increased or decreased whenever a certain time lapses. Also, an indicator for indicating the volume of the generated sound may be displayed on the display 100.

Figure 13:
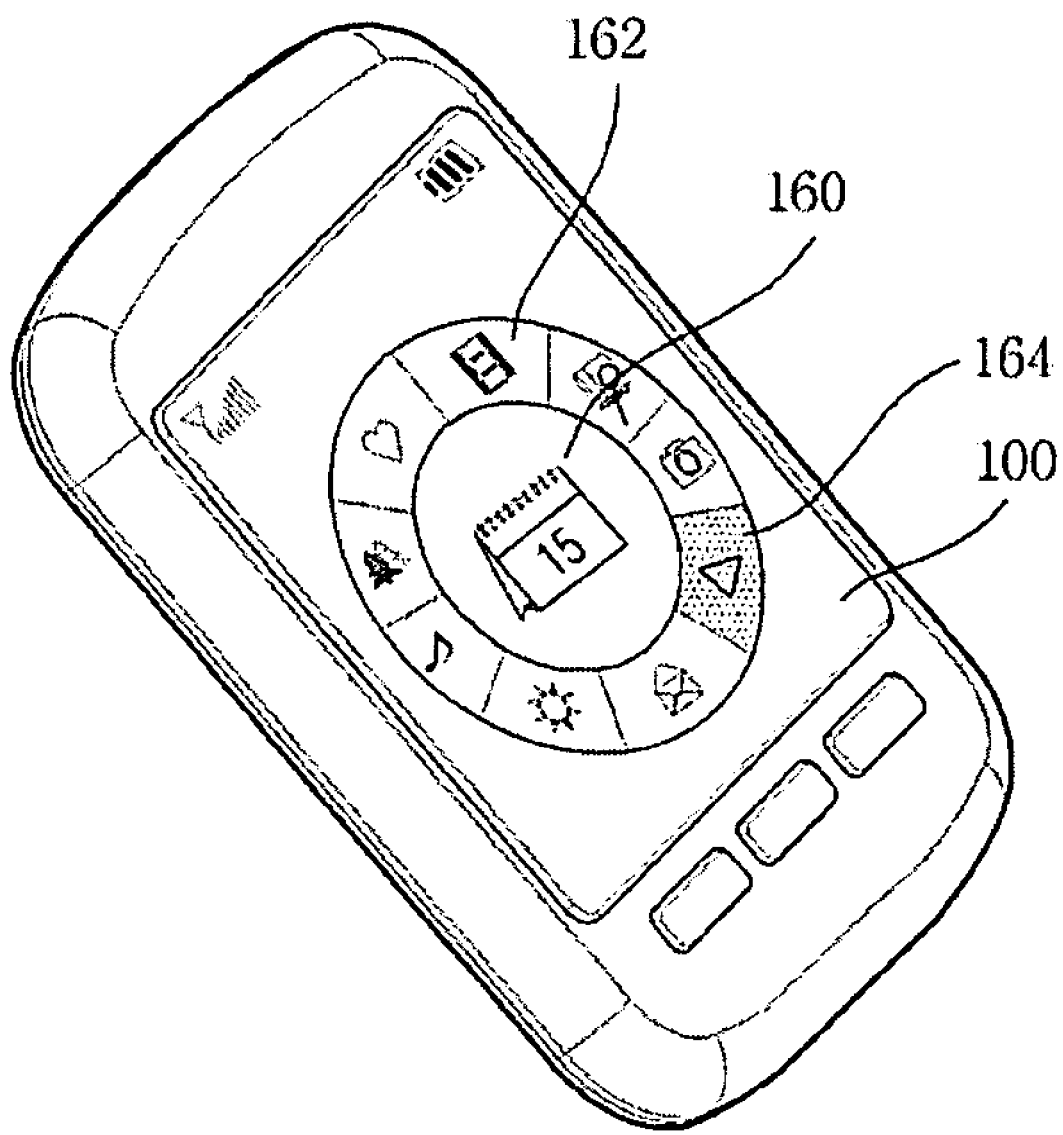

With reference to FIG. 13, a selectable menu is displayed on the display 100 when a menu select mode is selected by clicking the rotatable wheel 220 or a key button, In the menu select mode, a touch region 160 for selecting a particular mode is displayed at a central portion of the display 100. The touch region 160 is formed in a circular shape and selectable menu icons 162 are displayed in a circumferential area of the touch region or at an outer side of the touch region.

A pointing indicator 164 is also displayed in the menu select mode to indicate one of the icons 162 corresponding to a mode to be selected by clicking the rotatable wheel 200 or a key button. The pointing indicator 164 is displayed in a particular shape, such as an arrow, at a position where the icon 162 was displayed, thereby replacing the icon with the particular shape of the pointing indicator. The icon 162 replaced by the pointing indicator 164 is displayed at the touch region 160, preferably as an enlarged version of the icon. When the touch region 160 is touched, a mode corresponding to the displayed icon 162 displayed at the touch region is selected.

Figure 14:
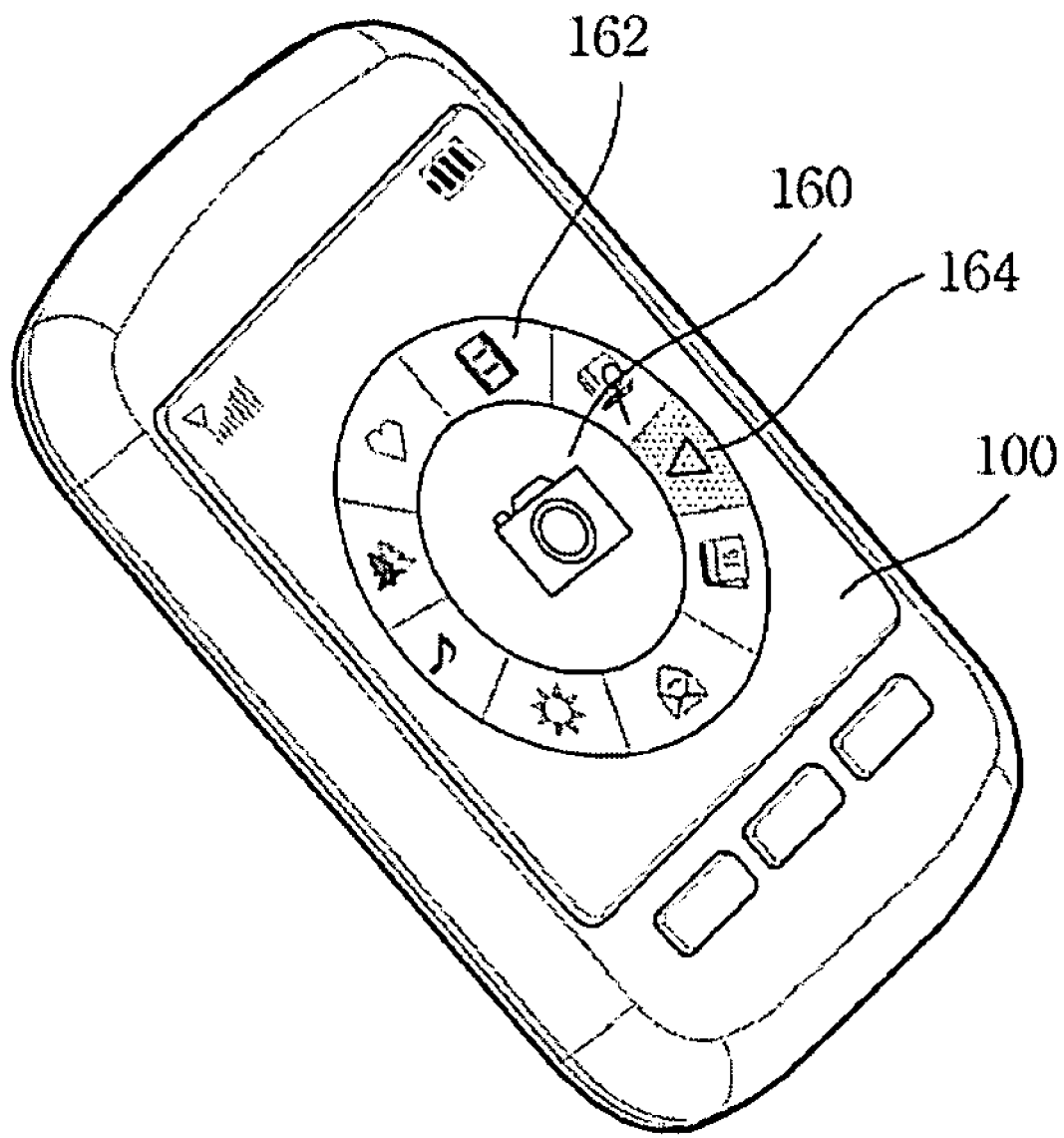

With reference to FIGS. 13 and 14, the pointing indicator 164 displayed on the display 100 selectively indicates the next icon 162 positioned clockwise or counterclockwise as the rotatable wheel 200 is rotated in either direction in the menu select mode. As illustrated in FIG. 13, a calendar indicating a schedule mode is displayed at the touch region 160 when the pointing indicator 164 indicates an icon for the schedule mode. As illustrated in FIG. 14, the rotatable wheel 200 is rotated to indicate an icon representing a camera mode by the pointing indicator 164.

As illustrated in FIG. 14, a camera icon representing the camera mode is displayed at the touch region 160 when the pointing indicator 164 indicates the icon representing the camera mode. When the rotatable wheel 200 is rotated by 45°, the pointing indicator 164 may indicate the next icon 162 continuously whenever a certain time lapses.

The operation of the above-described embodiment of the invention will now be described. In the present invention, the rotatable wheel 200 is positioned on the rear surface of the terminal and an upper portion of the rotatable wheel 200 protrudes from the rear surface of the terminal. This configuration of the rotatable wheel 200 allows a user to easily rotate or click the rotatable wheel with their index finger of one hand while holding the terminal for easy manipulation of the terminal. Since the rotatable wheel 200 that operates the terminal is positioned on the rear surface of the terminal, the entire front surface of the terminal may be used as the display 100, thereby providing a larger display area.

With reference to FIG. 10, a rotational direction of the rotatable wheel 200 can be sensed since the magnets 812 mounted on the rotatable wheel are rotated together when the rotatable wheel is rotated, thereby causing a change in a magnetic field at the Hall sensor 810 formed at the FPCB 800.

With reference to FIGS. 5 and 9, one of the movement protrusions 430 formed on the frame 400 is caught by one end of the hindrance protrusion 220 formed on the inner surface of the rotatable wheel 200 when the rotatable wheel 200 is rotated by 45° clockwise or counterclockwise. This hinders rotation of the rotatable wheel 200.

With reference to FIGS. 6 and 9, the protruding end portions of the torsion spring 240 are caught and compressed by the movement protrusions 430 formed on the frame 400 when the rotatable wheel 220 is rotated clockwise or counterclockwise. Therefore, the rotatable wheel 200 will return to its initial set position in response to the restoration force of the torsion spring 240 when the rotational force is removed.

With reference to FIGS. 2 and 6, a direct frictional contact between the rotatable wheel 200 and the frame 400 is prevented because the thrust washer 470 is mounted on the frame 400 and contacts the hindrance protrusion of the rotatable wheel 200, thereby allowing smooth rotation of the rotatable wheel. With reference to FIG. 2, the rotatable wheel 200 and the frame 400 can be easily combined by fastening the fixing washer 480 to the lower end portion of the rotatable wheel from the lower side when the rotatable wheel is mounted on the frame 400.

With reference to FIGS. 7 and 8, elastic force is applied to the coil spring 340 when the lens cover 330 is closed. Therefore, the lens cover 300 will not open if a user attempts to forcibly open the lens cover unless the corresponding force is stronger than the elastic force.

With reference to FIGS. 2 and 8, the vertical movement protrusion 720 moves up to slidably contact the rotary protrusion 322 as the motor 700 rotates. The vertical movement protrusion 720 slidably contacts the sloped faces of the rotary protrusion 322, thereby generating a horizontal force over the rotary plate 320 and causing the rotary plate to rotate according to the horizontal force.

With reference to FIGS. 7 and 8, the two lens covers 330 are rotated centering around the hinge shafts and separated from each other in order to open the through hole formed at the fixed plate 310 as the rotary plate 320 rotates. The lens of the camera 500 is exposed when the through hole of the fixed plate 320 is opened.

With reference to FIGS. 2 and 8, the coil spring 340 is constricted and stores elastic energy when the rotary plate 320 is rotated. The rotary plate 320 is rotated in the reverse direction by the elastic energy stored in the coil spring 340 when the vertical movement protrusion 720 moves down due to the motor 700 rotating in a reverse direction, thereby causing the lens cover 330 close the through hole formed at the fixed plate 310.

In the embodiment of the invention described above, the rotatable wheel 200 is provided on the rear surface of a bar type terminal. The display 100 may either be provided on a main body or on an inner surface of the folder of the terminal, such that the display is exposed when the folder is opened, or may be provided on an outer surface of the folder, such that the display is exposed even when the folder is closed.

Figure 15:
Figure 16:
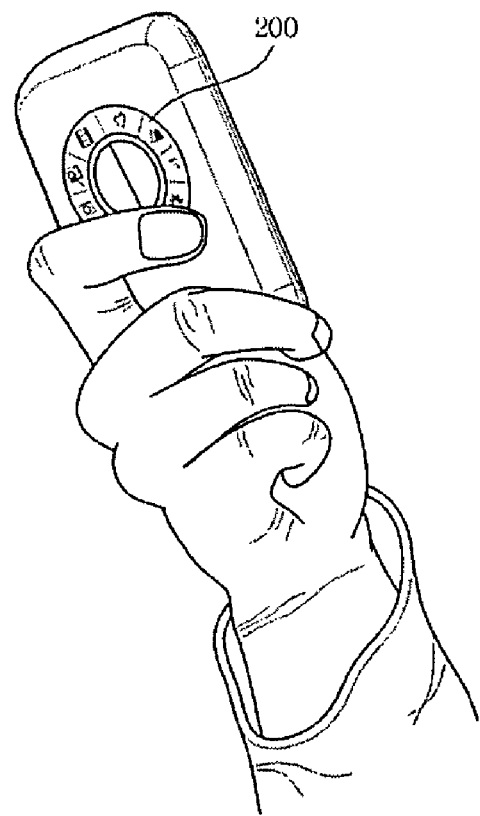

As illustrated in FIGS. 15 and 16, a user can easily rotate the rotatable wheel 200 with their index finger of one hand while holding the terminal because the rotatable wheel is positioned on the rear surface of the terminal and the upper end portion of the rotatable wheel is protrusively formed on the rear surface of the terminal. For example, a user engaged in communication using the terminal can easily rotate the rotatable wheel 200 in either direction with the index finger of the same hand that holds the terminal in order to selectively increase or decrease the sound volume. In addition, the user can rotate the rotatable wheel 200 to manipulate the terminal while watching images displayed on the display 100 without interrupting the view because the display is positioned on the front surface of the terminal.

In the terminal of the present invention, the touch region for selecting a particular mode is formed at the central region of the display in the menu select mode, selectable menu icons are displayed in a circumferential shape centering around the touch region, and an icon indicated by the indicator is displayed at the touch region.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:
   a body comprising a front side and an opposing rear side;
   a display located on the front side; and
   an input device located on the rear side and comprising a rotatable wheel,
   wherein the input device is configured to receive user input responsive to rotation of the wheel, and wherein a plane of the rotation is parallel to a surface of the rear side.

2. The terminal of claim 1, wherein the body is a unitary structure.

3. The terminal of claim 1, further comprising:
   an aperture formed within the rotatable wheel and sized to cooperate with a lens and an associated camera.

4. The terminal of claim 3, wherein the aperture is positioned at a center of the rotatable wheel.

5. The terminal of claim 3, further comprising:
   a lens opening and closing unit to open and close the lens of the camera.

6. The terminal of claim 5, wherein the lens opening and closing unit comprises:
   a fixed plate having a through hole to expose the lens;
   a rotatable rotary plate positioned at a lower side of the fixed plate and having a through hole to expose the lens; and
   a lens cover positioned at an upper side of the fixed plate and connected to the rotary plate to open and close the through hole formed at the fixed plate in response to rotation of the rotary plate.

7. The terminal of claim 6, wherein the lens cover comprises:
   a first portion rotating around a first shaft at a first point of the fixed plate; and
   a second portion rotating around a second shaft at a second point of the fixed plate,
   wherein the first portion and the second portion rotate and contact each other to close the through hole and rotate and separate from each other to open the through hole.

8. The terminal of claim 6, further comprising:
   a first elastic member that provides elastic force to return the rotating wheel to its initial set position when the rotating wheel is rotated; and
   a sensor that recognizes a rotational direction of the rotating wheel.

9. The terminal of claim 8, further comprising:
   a second elastic member provided between the fixed plate and the rotary plate, and providing elastic force to make the rotary plate return to its initial set position when the rotary plate is rotated.

10. The terminal of claim 9, wherein the second elastic member is a coil spring one end portion of which is connected to the fixed plate and the other end portion of which is connected to the rotary plate.

11. The terminal of claim 8, wherein the sensor is a Hall sensor that senses a change in a magnetic field of a magnet provided at the rotating wheel according to rotation of the rotating wheel.

12. The terminal of claim 8, further comprising:
    a frame provided within the terminal and on which the wheel is mounted.

13. The terminal of claim 12, further comprising:
    at least one signal terminal provided at a lower side of the frame that selects a particular mode of the terminal; and
    a pressing protrusion provided at an upper side of the signal terminal that moves down when the wheel is pressed in order to operate the signal terminal.

14. The terminal of claim 13, wherein the pressing protrusion is protrusively formed on a rear surface of the support plate and further comprising:
    a support plate provided at the lower side of the frame that supports the frame.

15. The terminal of claim 1, wherein the wheel is rotatable in a rotational range which is less than 180 degrees.

16. The terminal of claim 1, further comprising:
    a switch positioned below the wheel, wherein pressing down the switch causes an input.

17. The mobile terminal of claim 1, wherein a plurality of icons is displayed on the display and one of the plurality of icons is selected in response to the user input.

18. The terminal of claim 1, further comprising:
    at least one protrusion configured to selectively contact the wheel to restrict the rotation of the wheel within predetermined angles.

19. The terminal of claim 1, further comprising:
    a controller configured to repeatedly perform a specific function when the rotation of the wheel is maintained.

20. The terminal of claim 19, wherein the controller repeatedly performs the specific function when the rotation is maintained for a threshold time period.

21. The terminal of claim 20, wherein the specific function is one of a zooming function, a scrolling function, or an audio volume controlling function.

22. A mobile terminal, comprising:

a body comprising a front side and an opposing rear side;

a display unit located on the front side of the body;

an input unit comprising a rotatable wheel located at the rear side; and a camera unit comprising an aperture, wherein the input unit and the camera unit are located such that the aperture is positioned at a center of the rotatable wheel.

23. The mobile terminal of claim 22, further comprising:

a lens opening and closing unit positioned at the center of the wheel to open and close a lens of the camera.

\* \* \* \* \*